United States Patent
Shibata et al.

(10) Patent No.: US 9,262,647 B2
(45) Date of Patent: Feb. 16, 2016

(54) INFORMATION INPUT DISPLAY DEVICE AND CONTROL PROGRAM THEREOF

(75) Inventors: Tetsuhiro Shibata, Sagamihara (JP); Tatsuya Eguchi, Toyohashi (JP); Tsutomu Suka, Fussa (JP); Keiichiro Hyodo, Kokubunji (JP); Masayuki Inoue, Hachioji (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 728 days.

(21) Appl. No.: 13/524,768

(22) Filed: Jun. 15, 2012

(65) Prior Publication Data
US 2012/0324571 A1    Dec. 20, 2012

(30) Foreign Application Priority Data
Jun. 20, 2011    (JP) ................. 2011-136306

(51) Int. Cl.
| | |
|---|---|
| *G06F 21/83* | (2013.01) |
| *G06F 21/31* | (2013.01) |
| *G06F 21/57* | (2013.01) |
| *G06F 21/71* | (2013.01) |

(Continued)

(52) U.S. Cl.
CPC ............ *G06F 21/83* (2013.01); *G06F 3/04886* (2013.01); *G06F 21/31* (2013.01); *G06F 21/575* (2013.01); *G06F 21/71* (2013.01); *G06F 21/84* (2013.01); *G06F 2221/2141* (2013.01); *G06F 2221/2149* (2013.01)

(58) Field of Classification Search
None
See application file for complete search history.

(56) References Cited

U.S. PATENT DOCUMENTS

| | | |
|---|---|---|
| 5,923,841 A | 7/1999 | Lee |
| 6,148,403 A | 11/2000 | Haneda et al. |
| 6,556,224 B1 | 4/2003 | Banno |

(Continued)

FOREIGN PATENT DOCUMENTS

| | | |
|---|---|---|
| CN | 100524291 C | 8/2009 |
| EP | 1 816 580 A1 | 8/2007 |

(Continued)

OTHER PUBLICATIONS

The extended European Search Report dated Oct. 1, 2012, issued in corresponding European Patent Application No. 12170791.3. (8 pages).

(Continued)

*Primary Examiner* — Kaveh Abrishamkar
(74) *Attorney, Agent, or Firm* — Buchanan Ingersoll & Rooney PC

(57) ABSTRACT

An information input display device, having an input section for inputting information and a display section for displaying the information, which enables an access to protected information after being authenticated by an authentication processing executed after starting up of the information input display device, the information input display device including: an authentication processor which executes the authentication processing based on authentication information inputted by the input section; and an input display controller which, after the starting up of the information input display device and before being authenticated by the authentication processing, accepts inputting of prescribed information different from the authentication information through a screen displayed on the display section, and allows the display section to display the prescribed information on the screen.

11 Claims, 4 Drawing Sheets

(51) Int. Cl.
*G06F 21/84* (2013.01)
*G06F 3/0488* (2013.01)

(56) References Cited

U.S. PATENT DOCUMENTS

| | | | |
|---|---|---|---|
| 2003/0233557 A1* | 12/2003 | Zimmerman | 713/186 |
| 2004/0088588 A1* | 5/2004 | Awada et al. | 713/202 |
| 2004/0236508 A1 | 11/2004 | Ogasawara | |
| 2005/0091673 A1* | 4/2005 | Rhoten et al. | 719/329 |
| 2005/0223315 A1* | 10/2005 | Shimizu et al. | 715/512 |
| 2006/0146301 A1 | 7/2006 | Mogi | |
| 2007/0271608 A1 | 11/2007 | Shimizu et al. | |
| 2008/0005579 A1* | 1/2008 | Gaines et al. | 713/186 |
| 2008/0022195 A1* | 1/2008 | Lyle et al. | 715/230 |
| 2010/0153887 A1* | 6/2010 | Yamaguchi et al. | 715/854 |
| 2011/0023128 A1 | 1/2011 | Furuya | |
| 2012/0084734 A1 | 4/2012 | Wilairat | |
| 2013/0151999 A1* | 6/2013 | Seul | 715/762 |

FOREIGN PATENT DOCUMENTS

| | | |
|---|---|---|
| JP | 11-7420 A | 1/1999 |
| JP | 2000-148338 A | 5/2000 |
| JP | 2000-347955 A | 12/2000 |
| JP | 2003-030031 A | 1/2003 |
| JP | 2004-185160 A | 7/2004 |
| JP | 2004-302613 A | 10/2004 |
| JP | 2006-189542 A | 7/2006 |
| JP | 2006-230648 A | 9/2006 |
| JP | 2006-302199 A | 11/2006 |
| JP | 2007-310437 A | 11/2007 |
| JP | 2010-092185 A | 4/2010 |
| JP | 2010-277476 A | 12/2010 |
| WO | 2009/125862 A1 | 10/2009 |

OTHER PUBLICATIONS

Office Action (Notice of Reasons for Refusal) issued on Oct. 18, 2013, by the Japanese Patent Office in corresponding Japanese Patent Application No. 2011-136306, and an English Translation of the Office Action (7 pages).

Chinese First Notice of the Opinion on Examination dated Nov. 4, 2014 issued in the corresponding Chinese Patent Application No. 201210201762.9 and English translation (18 pages).

Chinese Second Notice of the Opinion on Examination dated Jul. 3, 2015 issued in the corresponding Chinese Patent Application No. 201210201762.9 and English translation (19 pages).

* cited by examiner

10: INFORMATION INPUT DISPLAY DEVICE

INFORMATION INPUT DISPLAY DEVICE AND CONTROL PROGRAM THEREOF

This application is based on Japanese Patent Application No. 2011-136306 filed on Jun. 20, 2011, in Japanese Patent Office, the entire content of which is hereby incorporated by reference.

BACKGROUND OF THE INVENTION

1. Technical Field

The present invention relates to an information input display device and a control program thereof, and particularly to an information input display device in which an authentication processing is executed after its startup, and a control program to control information input and display of the information input display device.

2. Background Technology

In recent years, portable devices provided with display sections (hereinafter referred as information input display device), such as notebook-size computer devices and tablet type terminals, are commonly used. In order to ensure security, these information input display devices are configured to display, at the time of starting up the devices, an authentication screen for inputting authentication information such as a user ID or a password, and after the authentication information is validated, variable functions are enable to be usable.

In many cases these information input display devices are being carried by users, they are becoming to be used not only for simply displaying the information, but as a notepad for inputting comments or messages, and for displaying the inputted comments or messages.

Regarding the input of these comments or messages, in JPA2004-302613, for example, an electronic settlement processing device is disclosed which realizes to smoothly execute the settlement process, by displaying a screen for urging a comment (such as a comment in a sticky note) input through a data processing screen after a previous input of password. Further, JPA2004-185160 discloses a work progress management system which realizes a smooth execution of the process, by providing an input column for comments from a boss, in a data processing screen after a previous input of password. JPA2010-277476 discloses a health guidance system which realizes a smooth execution of the health guidance, by enabling an input of a participant comment for participant ID and an input of a guide comment for guide ID, in a data processing screen after a previous input of password. Further, JPA2010-092185 discloses a network relay device which realizes management of user information by receiving previously registered user ID/password information as a message from a server, and displaying it on a screen. Furthermore, JPA2006-189542 discloses a print production system which is configured to enable a comment input as a data at the time of order processing on a print order terminal.

PROBLEMS TO BE SOLVED BY THE INVENTION

As described above, since the authentication processing is generally executed in order to restrict an access to the protected information, a user cannot use the function of the information input display device (especially, function as a notepad), until after the user inputs the authentication information such as the user ID or password, and the authentication information is completed.

Therefore, the user cannot input the comment or message before the authentication is validated, which causes a problem of inconvenience. Further, in case of restarting the information input display device which stores the abovementioned comment or message, those message or comment cannot be displayed before the authentication is completed, which also causes a problem of inconvenience.

The present invention is accomplished in view of the abovementioned problems, and its main objective is to provide the information input display device and the control program thereof, which enable inputting or readably displaying prescribed information different from the authentication information, before completing the authentication with authentication information inputted after the startup.

SUMMARY

I order to achieve the above objective, an information input display device, having an input section for inputting information and a display section for displaying the information, which enables an access to protected information after being authenticated by an authentication processing executed after starting up of the information input display device, the information input display device including:

an authentication processor which executes authentication processing bases on authentication information inputted by the input section; and an input display controller which accepts prescribed information different from the authentication information, at a screen displayed on the display section after the starting up and before being authenticated by the authentication processing, and which allows the display section to display the prescribed information on the screen.

A control program, reflecting another aspect of the present invention, is a program executable on an information input display device having an input section for inputting information and a display section for displaying the information and which enables an access to protected information after being authenticated by an authentication processing executed after starting up of the information input display device, the control program causing the information input display device to function as:

an authentication processor which executes the authentication processing based on authentication information inputted by the input section; and an input display controller which, after the starting up of the information input display device and before being authenticated by the authentication processing, accepts inputting of prescribed information different from the authentication information through a screen displayed on the display section, and allows the display section to display the prescribed information on the screen.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

As described in the background technology, information input display devices such as notebook-size computer devices and tablet type terminals, are commonly used, and the information input device is used to function as a notepad for writing and displaying comments or messages. In order to restrict the access to protected information, these information input display devices are generally configured to display, at the time of starting up the devices, an authentication screen for inputting authentication information such as a user ID or a password, and to execute the authentication processing based on the authentication information inputted by a user, therefore, the user cannot use the information input display device as a notepad until the authentication is completed.

Here, although the authentication processing is necessary for ensuring the security, among various processing to be executed by the information input display device, there is a processing, necessary for ensuring the security, such as displaying or editing the protected information of confidential document stored by an individual person and the like, and another type of processing, that is not necessary for ensuring the security, for simply inputting or displaying the comment or message and the like.

However in the conventional information input display devices, regardless of the processing to be executed being necessary or not for ensuring security, any of the processing cannot be executed unless after completion of the authentication, therefore the information input display devices cannot be used as the notepad for inputting a coming up comment or displaying a message and the like, which is inconvenient for users.

Therefore, according to one embodiment of the present invention, it is configured to enable inputting of prescribed information different from the authentication information, and displaying the inputted prescribed information, during the time from power activation and starting up the device to completion of authentication with the inputted authentication information. For example, in cases where the authentication screen for inputting the authentication information is displayed, by providing another area, on the authentication screen, for inputting and displaying the prescribed information different from the authentication information in addition to an area for inputting the authentication information, it is configured that the inputting and displaying of the prescribed information on the another area is enabled.

In this way, by enabling the inputting and displaying of the prescribed information different from the authentication information before the completion of the authentication, the user can write the message to convey the coming up comment or errand to the other person, and the person who received the message can read and confirm the errand by reading the message without making a login, which can remarkably improve the user's convenience.

EXAMPLE

Figure 1:
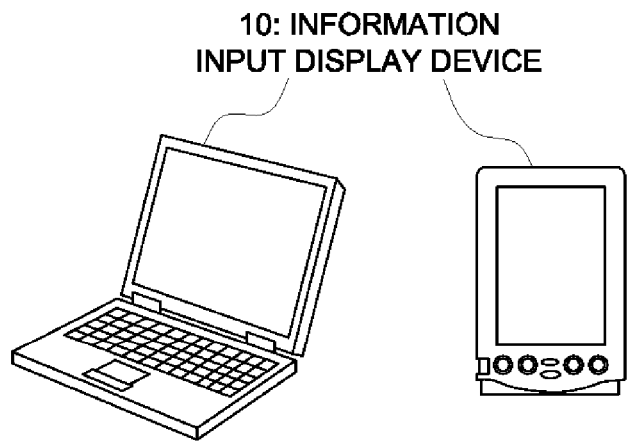
FIG. 1 illustrates an external view of an information input display device relating to one example of the present invention.
Figure 2:
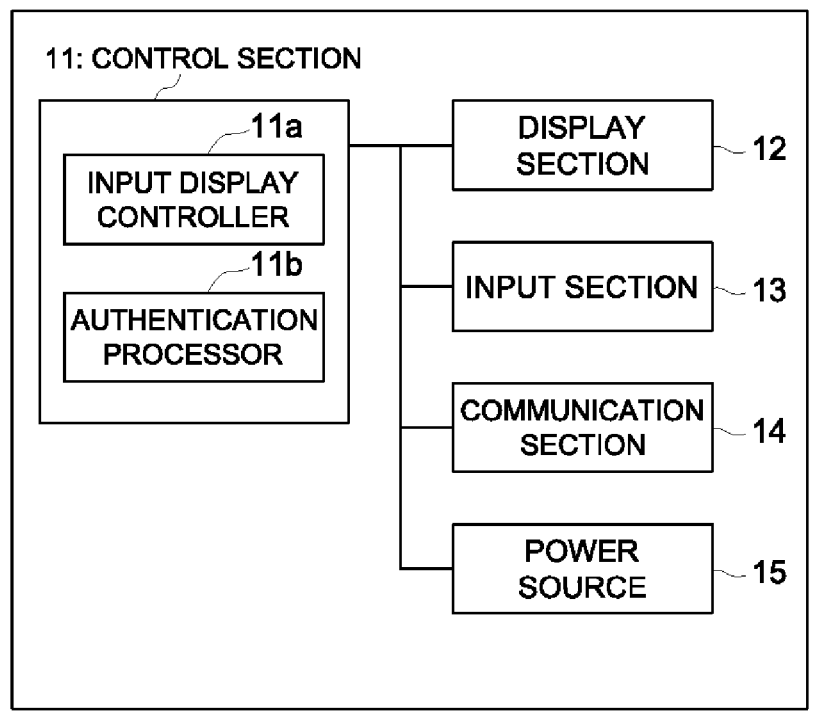
FIG. 2 is a block diagram showing a configuration of an information input display device relating to one example of the present invention.
Figure 3:
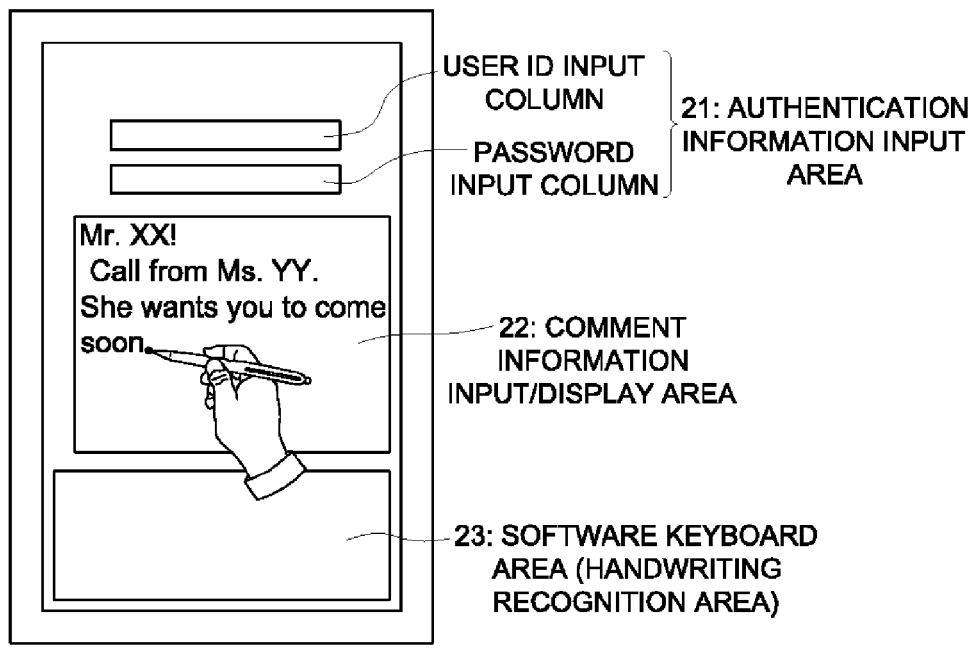
FIG. 3 illustrates an example of comment input operation using the information input display device relating to one example of the present invention.
Figure 4:
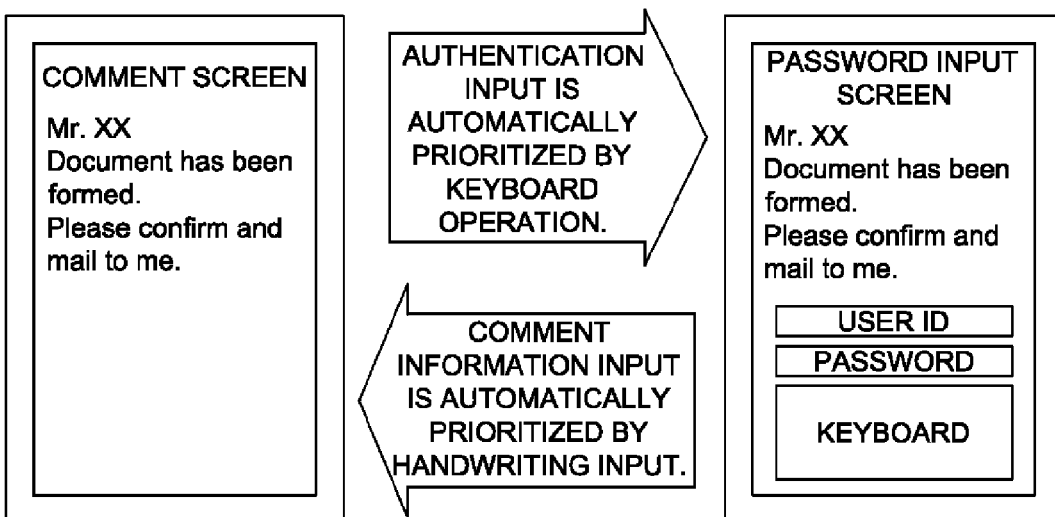
FIG. 4 illustrates another example of comment input operation using the information input display device relating to one example of the present invention.
Figure 5:
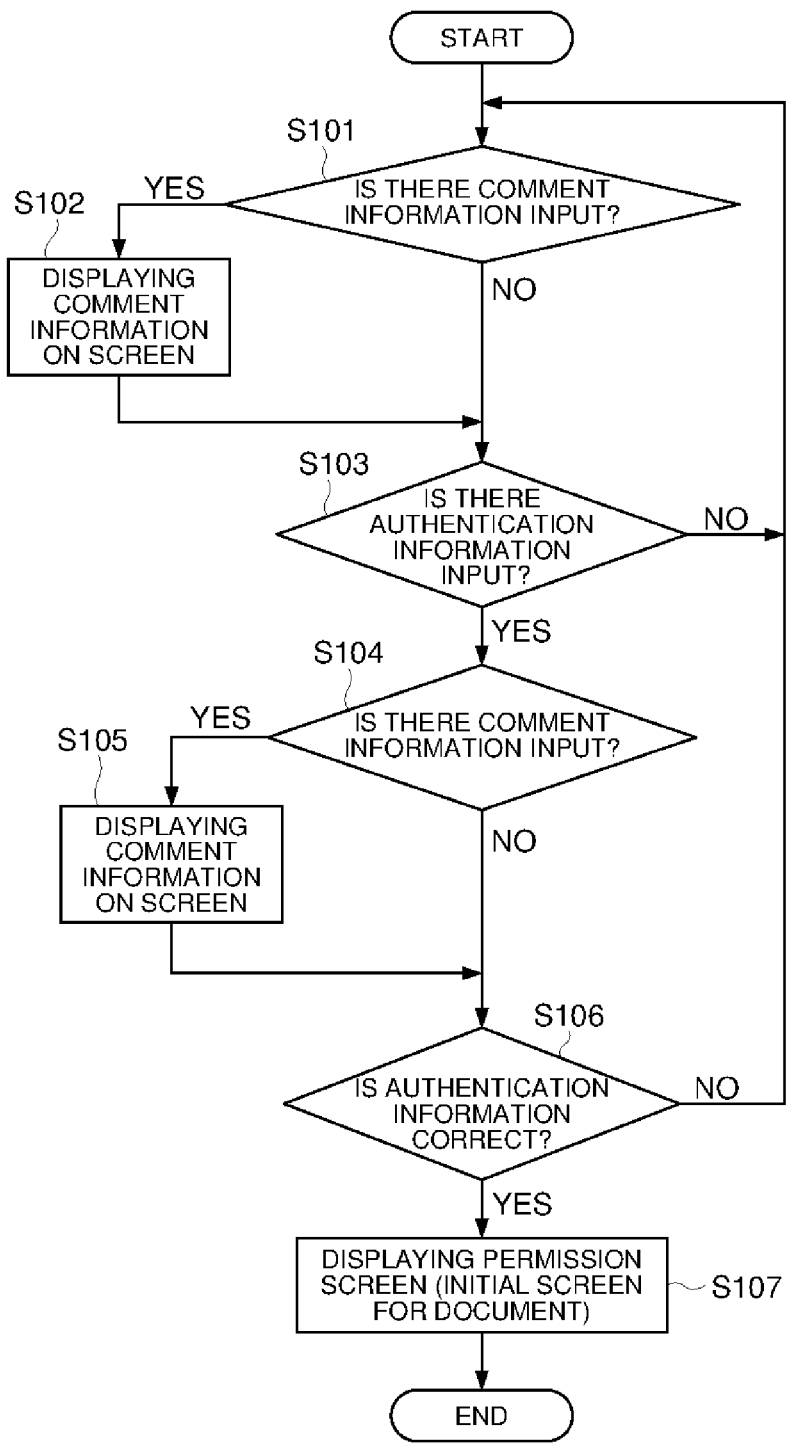
FIG. 5 is a flow chart showing an operation of the information input display device relating to one example of the present invention.
Figure 6:
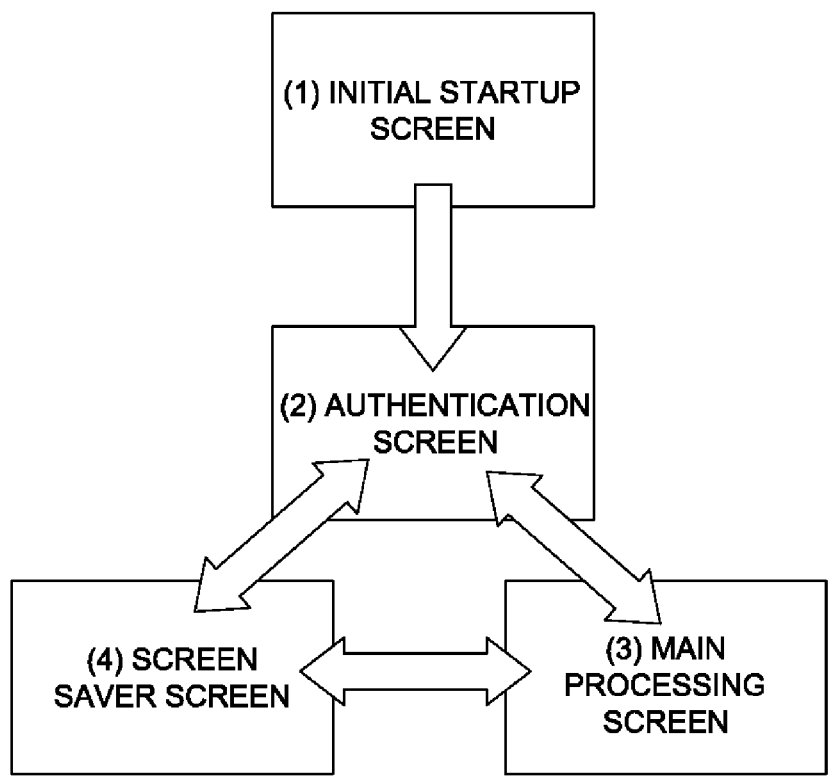
FIG. 6 illustrates an example of screen transition displayed on the information input display device relating to one example of the present invention.

In order to explain the embodiment of the present invention more in detail, the information input display device and control program thereof relating to one embodiment of the present invention will be described referring to FIG. 1 to FIG. 6. FIG. 1 illustrates an external view of the information input display device relating to one example of the present invention. FIG. 2 is a block diagram showing a configuration of the information input display device. FIG. 3 and FIG. 4 illustrate the comment input operation using the information input display device. FIG. 5 is a flow chart showing an operation of the information input display device. And, FIG. 6 illustrates an example of screen transition displayed on the information input display device relating to the present embodiment.

As shown in FIG. 1, information input display device 10 of the present embodiment is a device, such as a notebook-size computer device and a tablet type terminal, provided with a display section, and which executes the authentication processing based on the inputted authentication information in order to restrict the access to protected information. As shown in FIG. 2, this information input display device 10 is configured with control section 11, input section 13, communication section 14, power source 15 and the like.

Control section 11 is configured with a CPU (Central Processing Unit), memories such as ROM (Read Only Memory) and RAM (Random Access Memory), and as necessary an HDD (Hard Disk Drive) and the like. The CPU executes programs readout from the memories or the HDD, and controls operation of each section. The memories and HDD stores various programs to be executed by the CPU, setting information (for example, authentication information) for controlling the movement of the information input display device 10, various data (for example, document data) and the like.

Further, the abovementioned control section 11 also functions as input display controller 11a, authentication processor 11b and the like.

After the information input display device is activated by an operation of the power switch in the input section 13, and before the authentication is completed by the authentication information such as the user ID and password, the input display controller 11a controls to display an area (later described as comment information input/display area) for inputting and displaying prescribed information different from the authentication information (hereinafter referred as comment information).

In cases where information is inputted through the abovementioned screen, the input display controller 11a determines whether the inputted information is the authentication information such as the user ID and password, or the comment information. In case that the inputted information is the authentication information, the input display controller 11a notifies the authentication information to the authentication processor 11b, and in case that the inputted information is the comment information, controls to display the comment information on the screen or store in the memory or the HDD.

The authentication processor 11b, in cases where the authentication information such as the user ID and the password is inputted, executes authentication processing by comparing the inputted authentication information with information previously stored in the memory, and if the authentication information matched with each other, gives permission of the processing (particularly, an access to protected information) executable by the information input display device 10.

The screen having the area for inputting and displaying the comment information may be an exclusive screen for inputting and displaying the comment information, or may be a usual screen to be displayed after startup of the device and before the completion of the authentication (for example, an initial screen at the starting up or the authentication screen for inputting the authentication information) that is added with the abovementioned area.

The input display controller 11a and the authentication processor 11b may be structured as a hardware, or may be configures as a control program that functions the control section 11 as the input display controller 11a and the authentication processor 11b, the control program being executed on the control section 11.

Display section 12 is configured with a liquid crystal display device (LCD), organic EL (electroluminescence) display device and the like, and displays a screen before authentication (such as an initial screen at startup and an authentication screen) and screens after the completion of authentication (screens for the functions to be executable by logging-in, such as screens for executing display/editing/storage and the like).

Input section 13 is configured with various switches such as a switch for switching the power ON/OFF, and an electrostatic capacitance type touch panel arranged with a lattice shaped transparent electrode, and the like. The touch panel outputs signals to the control section 11 from the transparent electrode arranged at the contacted part by a finger. Thus the input of authentication information and comment information is enabled.

Communication section 14 is configured with a NIC (Network Interface Card), modem or the like, and enables the communication with a server or a computer apparatus connected with a network via cable communication, wireless communication, or infrared communication.

Power source 15 is a battery and the like (such as a secondary battery) which supplies electric power for driving each section of the information input display device 10.

FIG. 1 and FIG. 2 shows an example of the information input display device 10 of the present embodiment, and its configuration can be changeable if input and display of the comment information is possible after the starting up and before the authentication. For example, in FIG. 2, the communication section 14 is provided for connecting the information input display device 10 with the network, however in cases where the document data is acquired by using a USB (Universal Serial Bus) memory, the communication section 14 can be omitted.

Further, in the present embodiment, although the device is configured to input the authentication information such as the user ID and the password, in cases where the authentication processing is executed by the use of biological information such as fingerprint patterns or vein patterns, a sensor to read the biological information or a pattern recognition processor may be provided. Further, in case of executing the authentication processing by use of the authentication information stored in an RFID (Radio frequency Identification) tag, the RFID tag and an RFID reader for communicating with the RFID tag may be provided.

Next, the screen provided with an area for executing the input and display of the comment information will be described referring to FIGS. 3 and 4. Wherein, the screen provided with the area for executing the input and display of the comment information is a screen before the login, including the initial screen at startup and the authentication screen and the like as described above. In the below, the authentication screen is described as an example.

As shown in FIG. 3, the authentication screen 20 as the screen before the login in the present embodiment is provided with authentication information input area 21 including a user ID input column for inputting the user ID and a password input column for inputting the password, and the user can input the authentication information in the user ID input column and the password input column, by punching-in the authentication information by use of software keyboard displayed in the software keyboard area 23, or by hand-writing the authentication information in the handwriting recognition area 23.

Further, in the present embodiment, a comment information input/display area 22 for inputting the comment information and displaying the inputted comment information is provided on the authentication screen 20, and the user can input the comment information by directly inputting the comment information in the comment information input/display area 22, punching-in the comment information by use of the software keyboard displayed in the software keyboard area 23, or by handwriting the comment information in the handwriting recognition area 23, and the inputted comment information can be displayed in the comment information input/display area 22.

Since FIG. 3 is illustrated as an example, its configuration can be properly changeable. For example, although the software keyboard area 23 (handwriting recognition area) is provided in FIG. 3, in cases where the input section 13 is provided with a hardware keyboard, the software keyboard area 23 can be omitted.

Further in FIG. 3, although the authentication information input area 21 includes the user ID input column and the password input column, a configuration is possible where the authentication processing is performed only by the password, by omitting the user ID input column and providing only the password input column. Further, in FIG. 3, the user ID input column and the password input column are visually displayed on the authentication screen 20, in cases where the authentication information such as the user ID and the password is not required to be displayed, the user ID input column and the password input column may not be visually displayed on the authentication screen.

Further, in FIG. 3, the authentication information input area 21 and the comment information input/display area 22 are separately arranged, the authentication information input area 21 and the comment information input/display area 22 can be overlapped. In this case, as shown in FIG. 4, in case of inputting by handwriting, the comment information input/display area 22 may be automatically transferred to be a foremost screen (the left side screen), and in case of inputting by use of the software keyboard, the authentication information input area 21 may be transferred to be the foremost screen (the right side screen), The input display controller 11a may automatically switch the display to realize this control.

Further, it is also possible to make the whole area of the authentication screen 20 to be the comment information input/display area 22. In this case, when the software keyboard or the other authentication device (for example, a sensor to read the biological information, or an RFID reader to read the authentication information of RFID tag) is operated, the screen automatically may transfer to authentication information input screen. The input display controller 11a may automatically switch the display to realize this control.

In the abovementioned case, in cases where the comment information is handwritten in the user ID input column or the password input column, the handwritten comment information can be temporarily deleted from the screen at the time of setting the password.

Hereinafter, the operation of information input display device 10 of the present embodiment will be described referring to the flow chart of FIG. 5. In below, the case will be described that input/display of comment information is executed in the state of authentication screen 20 of FIG. 3 being displayed.

Firstly, when the user operates the input section 13 (by putting the power switch ON), to activate the information input display device 10, the control section (input display controller 11a) of the information input display device 10 controls to display the authentication screen 20 as shown in FIG. 3. Here, in the conventional authentication screen, only the authentication information such as the user ID or the password can be inputted, however in the present embodiment, since the comment information input/display area 22 is provided in the authentication screen 20, the comment information different from the authentication information can be inputted.

Then, the control section 11 (input display controller 11a) determines whether the comment information is inputted (S101), and in case of the comment information being inputted, displays the inputted comment information in the comment information input/display area 22 on the authentication screen 20 (S102), and by attaching as necessary an arbitrary file name (such as a file name made of the date of input or characters extracted from the inputted comment information) to the inputted comment information, stores in a memory preferably in a nonvolatile memory.

Next, the input display controller 11a determines whether the authentication information such as the user ID or the password is inputted (S103), and in case that the authentication information is not inputted, returns to S101 and repeats the similar process. On the other hand, in case that the authentication information is inputted, although in conventional way the other processing cannot be executed until the authentication is completed, according to the present embodiment the comment information can be inputted in the comment information input/display area 22 during the time before the authentication completion.

Then, the input display controller 11a determines whether the comment information is inputted (S104), and in case of the comment information being inputted, displays the inputted comment information in the comment information input/display area 22 on the authentication screen 20 (S105), and by attaching as necessary an arbitrary file name (such as a file name made of the date of input or characters extracted from the inputted comment information) to the inputted comment information, stores in a memory preferably in a nonvolatile memory.

Next, the control section 11 (authentication processor 11b) determines whether the authentication information is valid or not by comparing the inputted authentication information with the authentication information previously stored in the memory (S106), and in case that the authentication information is not correct, returns to S101 and repeats the similar process. On the other hand, in case that the authentication information is correct, displays an allowed screen such as an initial screen of document (S107). Then, after executing various processing on said screen, the user put the power OFF and shuts down the information input display device 10.

After that, in cases where the information input display device 10 is started-up by putting the power ON again, it is possible to enable the input of comment information without displaying anything in the comment information input/display area of initially displayed screen, or to enable the reading-out and displaying of the comment information stored in the nonvolatile memory.

As described above, after starting-up of the device, at any stage before completion of authentication with the inputted authentication information, the user can input the comment information, and can simply write a comment coming up with or a message to be conveyed to the other person. And a user, who received the information input display device 10 in which the message has been written, can confirm the message without logging-in, which improves user's convenience. Further, according to the configuration where the comment information is stored in the nonvolatile memory, even in the case where the information input display device 10 having been power OFF, the comment information can be displayed on the after-restart screen, which can further improve the user's convenience.

Although the above described flow is configured such that the comment information input/display is executed in the state that the authentication screen 20 is displayed, as long as before the completion of the authentication with the inputted authentication information (namely, before transition to the approval screen), the comment information input/display can be executed in the state of any screen being displayed. Examples of cases, where a plurality of screens are displayed before transition to the approval screen, will be described below.

FIG. 6 shows an example of screen transition to be displayed on the display section 12 of the information input display device 10. In case that Windows™ is installed as an OS (Operating System), when the power of the information input display device 10 is switched ON, initial startup screen (logo display screen) (1) is firstly displayed. The initial startup screen is a screen to be displayed at the time of starting up the system, when main programs constituting the system are executed. At this time, by preceding launching of the control program which functions as the input display controller 11a, the comment information input/display is enabled. Further, by arranging a device specified to displaying (such as a Boogie Board) overlapped to the display section 12, the comment information input/display can be done regardless of the system startup.

Next, when the system startup is completed, the authentication screen (2) is displayed. Even in the state that the authentication screen is displayed (before input of the authentication information and before completion of the authentication by the inputted authentication information), the comment information input/display is enabled, as explained referring to the flowchart of FIG. 5.

Next, when the authentication is completed by the inputted authentication information, a main processing screen (3) (the screen on which arbitrary application can be operated) is displayed. In the state that the main processing screen is displayed, by activating an application such as the notepad, the comment information input/display is enabled as conventionally.

Further, in cases where the state of not operating the input section 13 continues for a prescribed period, a screen saver screen (4) may be displayed in order to prevent burn-in of the screen. On this screen saver screen, when any key is pushed, a mouse is moved or the touch panel is touched, the screen transits to the authentication screen (2) or the main processing screen (3), and the comment information input/display is enabled again.

Further, executing the comment information input/display is possible directly on (4) screen saver screen. In this case for example, by excluding Shift key from any key, and configuring to display the comment information input/display area 22 when the Shift key is pushed, the input/display of comment information is enabled. Further, in the case where the screen saver is a display scroll type, by temporarily making the display pose with the Shift key, the comment information input/display can be preceded.

The comment information inputted on each screen can be displayed again at the time of returning to the original screen after the screen transition. For example, in the case where information of "AAA" is inputted on the authentication screen (2), by storing the information in the memory, after the transition to the screen saver screen (4) when returning to the authentication screen (2), the information of "AAA" can be displayed by reading out the information from the memory. Further by storing the comment information inputted on each screen into the nonvolatile memory, at the time of displaying again the initial startup screen (1) or the authentication screen (2), the stored comment information can be displayed.

As described above, the information input display device 10 (or the control program) of the present embodiment provides, in an arbitrary screen (initial startup screen, authentication screen, screen saver screen and the like) after the startup of the device and before completion of the authentication by the inputted authentication information, the comment information input/display area 22, and if the inputted information is the comment information, controls to display it in the comment information input/display area 22. Therefore, users can utilize the information input display device 10 as a notepad, which can improve the user's convenience.

According to the information input display device and the control program of the present invention, it is enabled to input or readably display the prescribed information different from the authentication information, before completing the authentication with the inputted authentication information and after the startup.

This is due to the information input display device (control program) which controls to enable the inputting or readably displaying the prescribed information different from the authentication information, on the screen displayed during the time between the startup and the completion of authentication with the authentication information inputted by the user.

The present invention should not be restricted by the above described embodiment, and the configuration or the control of the present invention is properly changeable without departing from the scope of the present invention.

For example, in the above embodiment the case is described where character information such as comments or messages is inputted, however the information to be inputted is not restricted to the character information, but image information such as graphics or pictures may be inputted.

Further, in the above described embodiment, the configuration is described in which inputting/displaying of the comment information is enabled after the startup and before the completion of authentication, processing to be enabled is not restricted to the inputting/displaying of the comment information, but it can be similarly applicable to arbitrary processing which does not require an access to protected information.

The present invention is applicable to an information input display device which requires authentication processing for restricting an access to the protected information, and to the control program which operates on said information reading device.

EXPLANATION OF CODES

10: information input display device
11: control section
11a: input display controller
11b: authentication processor
12: display section
13: input section
14: communication section
15: power source
20: authentication screen
21: authentication input area
22: comment information input/display area
23: software keyboard area (handwriting recognition area)

What is claimed is:

1. An information input and display device, comprising:
an input section for inputting information;
a display section for displaying the information;
an authentication processor which executes authentication processing based on authentication information inputted by the input section; and
an input and display controller which, after the starting up of the information input and display device and before being authenticated by the authentication processing, accepts inputting of non-confidential information, different from the authentication information, through the input section and allows the display section to display the non-confidential information in a window, and which input and display controller allows the display section to display protected information in response to the information input and display device being authenticated by the authentication processing,
wherein the window is an authentication window comprising an input area for inputting the authentication information and an input/display area for inputting and displaying the non-confidential information, and
in response to accepting inputting of information that is handwritten, the input and display controller allows the display section to automatically change the authentication window such that the input/display area covers the whole area of the authentication window, and in response to accepting inputting of information entered by a keyboard, the input and display controller allows the display section to automatically change the authentication window such that the input area overlaps on the input/display area.

2. The information input and display device of claim 1, wherein the authentication window transitions to a transition window.

3. The information input and display device of claim 1, wherein the input display controller stores the inputted non-confidential information in a memory, and when displaying the non-confidential information, the input display controller reads out the non-confidential prescribed information from the memory and displays the non-confidential information.

4. The information input and display device of claim 1, wherein the input display controller stores the inputted non-confidential information in a nonvolatile memory, and when the information input and display device is restarted, the input display controller reads out the non-confidential information from the nonvolatile memory and displays the non-confidential information.

5. The information input and display device of claim 1, wherein the input display controller determines whether the input information is authentication information or non-confidential information.

6. The information input and display device of claim 1, wherein the input and display controller allows the display section to display the protected information only after the information input and display device is authenticated by the authentication processing.

7. A non-transitory computer-readable storage medium having a control program stored thereon which is executable on an information input and display device having an input section for inputting information and a display section for displaying the information, the control program causing the information input and display device to:

execute authentication processing based on authentication information inputted by the input section; and after the starting up of the information input and display device and before being authenticated by the authentication processing, accept inputting of non-confidential information, different from the authentication information, through the input section and allow the display section to display the non-confidential information on a window, and which input display controller allows the display section to display protected information in response to the information input and display device being authenticated by the authentication processing, wherein the window is an authentication window comprising an input area for inputting the authentication information and an input/display area for inputting and displaying the non-confidential information, and in response to accepting inputting of information that is handwritten, the control program allows the display section to automatically change the authentication window such that the input/display area covers the whole area of the authentication window, and in response to accepting inputting of information entered by a keyboard, the control program allows the display section to automatically change the authentication window such that the input area overlaps on the input/display area.

8. The non-transitory computer-readable storage medium of claim 7, wherein the authentication window transitions to a transition window.

9. The non-transitory computer-readable storage medium of claim 7, wherein the input display controller stores the inputted non-confidential information in a memory, and when displaying the non-confidential information, the input display controller reads out the non-confidential information from the memory and displays the non-confidential information.

10. The non-transitory computer-readable storage medium of claim 7, wherein the input display controller stores the inputted non-confidential information in a nonvolatile memory, and when the information input display device is restarted, the input display controller reads out the non-confidential information from the nonvolatile memory and displays the non-confidential information.

11. The non-transitory computer-readable storage medium of claim 7, wherein the input and display controller allows the display section to display the protected information only after the information input and display device is authenticated by the authentication processing.

* * * * *